US012598028B2

(12) United States Patent
Yoshioka et al.

(10) Patent No.: US 12,598,028 B2
(45) Date of Patent: Apr. 7, 2026

(54) COMMUNICATION APPARATUS AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 479 days.

(21) Appl. No.: 17/311,497

(22) PCT Filed: Dec. 27, 2018

(86) PCT No.: PCT/JP2018/048283
§ 371 (c)(1),
(2) Date: Jun. 7, 2021

(87) PCT Pub. No.: WO2020/136838
PCT Pub. Date: Jul. 2, 2020

(65) Prior Publication Data
US 2022/0038217 A1 Feb. 3, 2022

(51) Int. Cl.
*H04W 72/20* (2023.01)
*H04L 1/1812* (2023.01)
*H04L 5/00* (2006.01)
*H04W 72/044* (2023.01)

(52) U.S. Cl.
CPC .......... *H04L 1/1819* (2013.01); *H04L 5/0053* (2013.01); *H04W 72/0473* (2013.01); *H04W 72/20* (2023.01)

(58) Field of Classification Search
None
See application file for complete search history.

(56) References Cited

U.S. PATENT DOCUMENTS

| | | | | |
|---|---|---|---|---|
| 11,101,963 B2 * | 8/2021 | Kim | ...................... | H04L 1/1887 |
| 11,706,009 B2 * | 7/2023 | Kim | ...................... | H04L 1/1887 |
| | | | | 370/329 |
| 2017/0215183 A1 | 7/2017 | Gulati et al. | | |
| 2020/0196255 A1 * | 6/2020 | Cheng | ................... | H04L 5/0092 |
| 2020/0205165 A1 * | 6/2020 | Huang | ................... | H04L 1/1854 |
| 2020/0205166 A1 * | 6/2020 | Huang | ................... | H04W 76/27 |

(Continued)

FOREIGN PATENT DOCUMENTS

EP        3672337 A2      6/2020

OTHER PUBLICATIONS

International Search Report issued in PCT/JP2018/048283 on Feb. 19, 2019 (5 pages).

(Continued)

*Primary Examiner* — Kodzovi Acolatse
(74) *Attorney, Agent, or Firm* — Osha Bergman Watanabe & Burton LLP

(57)        ABSTRACT
A communication apparatus including a transmitting unit configured to transmit an SFCI (Sidelink Feedback Control Information) including a Hybrid Automatic Repeat Request (HARQ) response on a Physical Sidelink Feedback Channel (PSFCH), and a control unit configured to, in a case where the PSFCH overlaps another inter-terminal direct communication channel, perform control to transmit the SFCI by multiplexing the SFCI with the another inter-terminal direct communication channel.

3 Claims, 18 Drawing Sheets

(56) References Cited

U.S. PATENT DOCUMENTS

2023/0107863 A1*  4/2023  Farag ................... H04W 72/40
370/329

OTHER PUBLICATIONS

Written Opinion of the International Searching Authority issued in PCT/JP2018/048283 on Feb. 19, 2019 (4 pages).

Fujitsu; "Considerations on HARQ-ACK feedback for NR-V2X unicast"; 3GPP TSG RAN WG1 Meeting #95, R1-1812411; Spokane, USA; Nov. 12-16, 2018 (5 pages).

Huawei, HiSilicon; "Design and contents of PSCCH and PSFCH"; 3GPP TSG RAN WG1 Meeting #95, R1-1813554; Spokane, USA; Nov. 12-16, 2018 (7 pages).

3GPP TS 36.213 V14.3.0; "3rd Generation Partnership Project; Technical Specification Group Radio Access Network; Evolved Universal Terrestrial Radio Access (E-UTRA); Physical layer procedures (Release 14)" Jun. 2017 (460 pages).

Extended European Search Report in counterpart European Application No. 18 94 4611.5 issued May 16, 2022 (13 pages).

LG Electronics; "Discussion on coexistence mechanisms"; 3GPP TSG RAN WG1 Meeting #94, R1-1808528; Gothenburg, Sweden; Aug. 20-24, 2018 (2 pages).

Nokia et al; "Tx power allocation in SL CA"; 3GPP TSG-RAN WG1 Meeting #91, R1-1720486; Reno, USA; Nov. 27 -Dec. 1, 2017 (2 pages).

Office Action issued in counterpart Indian Patent Application No. 202117025461 mailed on Jan. 12, 2023 (6 pages).

Office Action issued in Japanese Application No. 2020-562246 mailed on Oct. 25, 2022 (5 pages).

Office Action in the counterpart European Application No. 18944611.5, mailed Jun. 22, 2023 (8 pages).

Panasonic: "PUSCH/PUCCH overlap handling"; 3GPP TSG RAN WG1 Meeting #83, R1-156951, Anaheim, USA, Nov. 15-22, 2015 (2 pages).

Samsung: "Priority handling for UE autonomous resource selection"; 3GPP TSG RAN WG1 Meeting #85, R1-164761, Nanjing, May 23-27, 2016 (5 pages).

Qualcomm Incorporated: "PUCCH collision in eMTC"; 3GPP TSG RAN WG1 Meeting #88, R1-1703962, Athens, Greece, Feb. 13-17, 2017 (3 Pages).

Samsung: "Discussion on physical layer structures for NR V2X"; 3GPP TSG RAN WG1 #95, R1-1813866, Spokane, USA, Nov. 12-16, 2018 (11 pages).

Office Action issued in European Patent Application No. 18944611.5, dated Dec. 3, 2024 (13 pages).

* cited by examiner

■ LTE−V2X: two types of SL transmission mode

SL transmission mode 3:
Uu−based SL scheduling

10

1 SL scheduling

2. PSCCH/
PSSCH

20A

20B

SL transmission mode 4:
UE−self resource selection

1. PSCCH/
PSSCH

Figure 3:
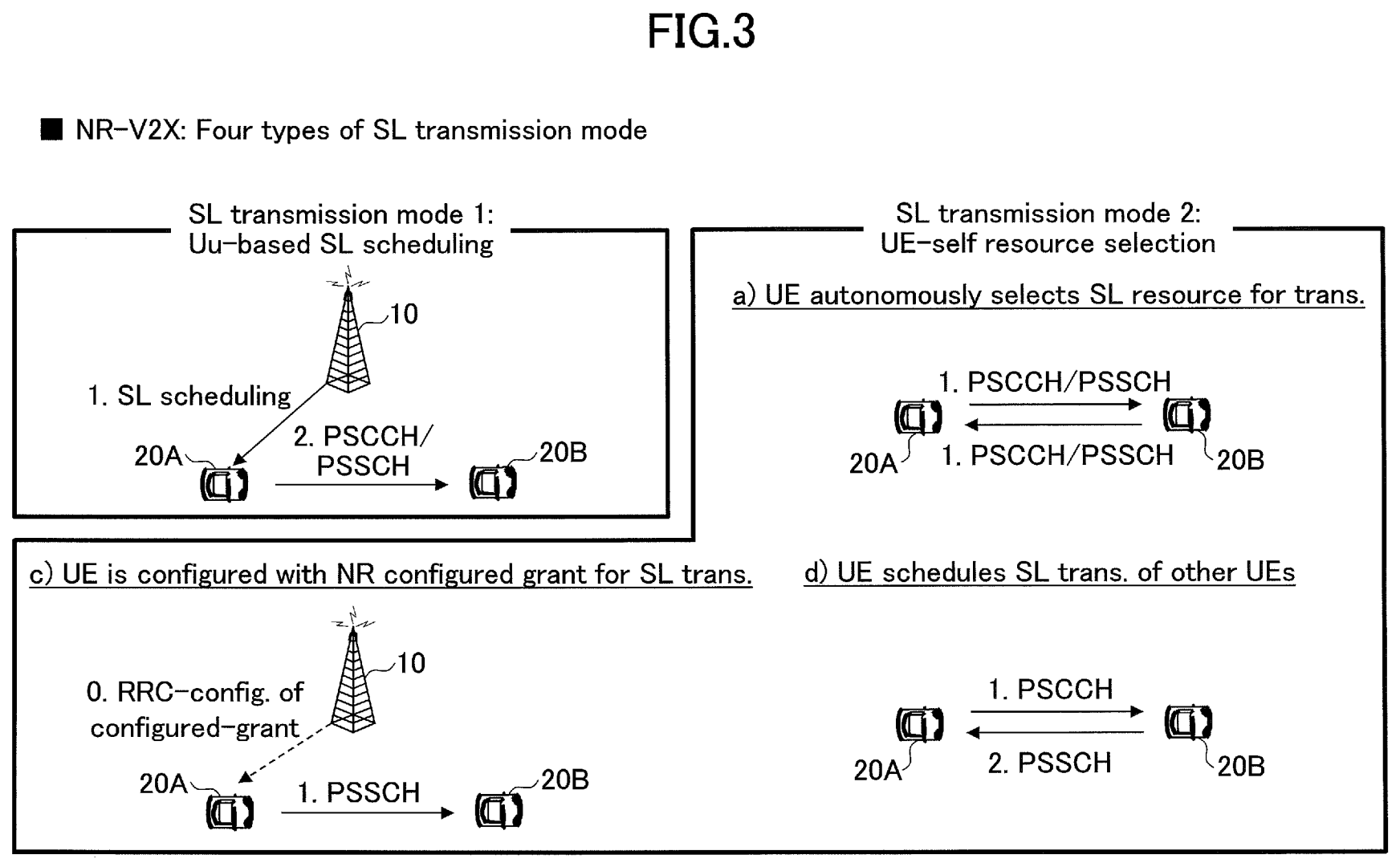

■ NR–V2X: Four types of SL transmission mode

SL transmission mode 2:
UE–self resource selection a) UE autonomously selects SL resource for trans.

1. PSCCH/PSSCH

1. PSCCH/PSSCH 20A     20B d) UE schedules SL trans. of other UEs

1. PSCCH

2. PSSCH 20A     20B

SL transmission mode 1:
Uu–based SL scheduling

10

1. SL scheduling

2. PSCCH/PSSCH 20A     20B c) UE is configured with NR configured grant for SL trans.

10

0. RRC–config. of configured–grant

1. PSSCH 20A     20B

FIG.5

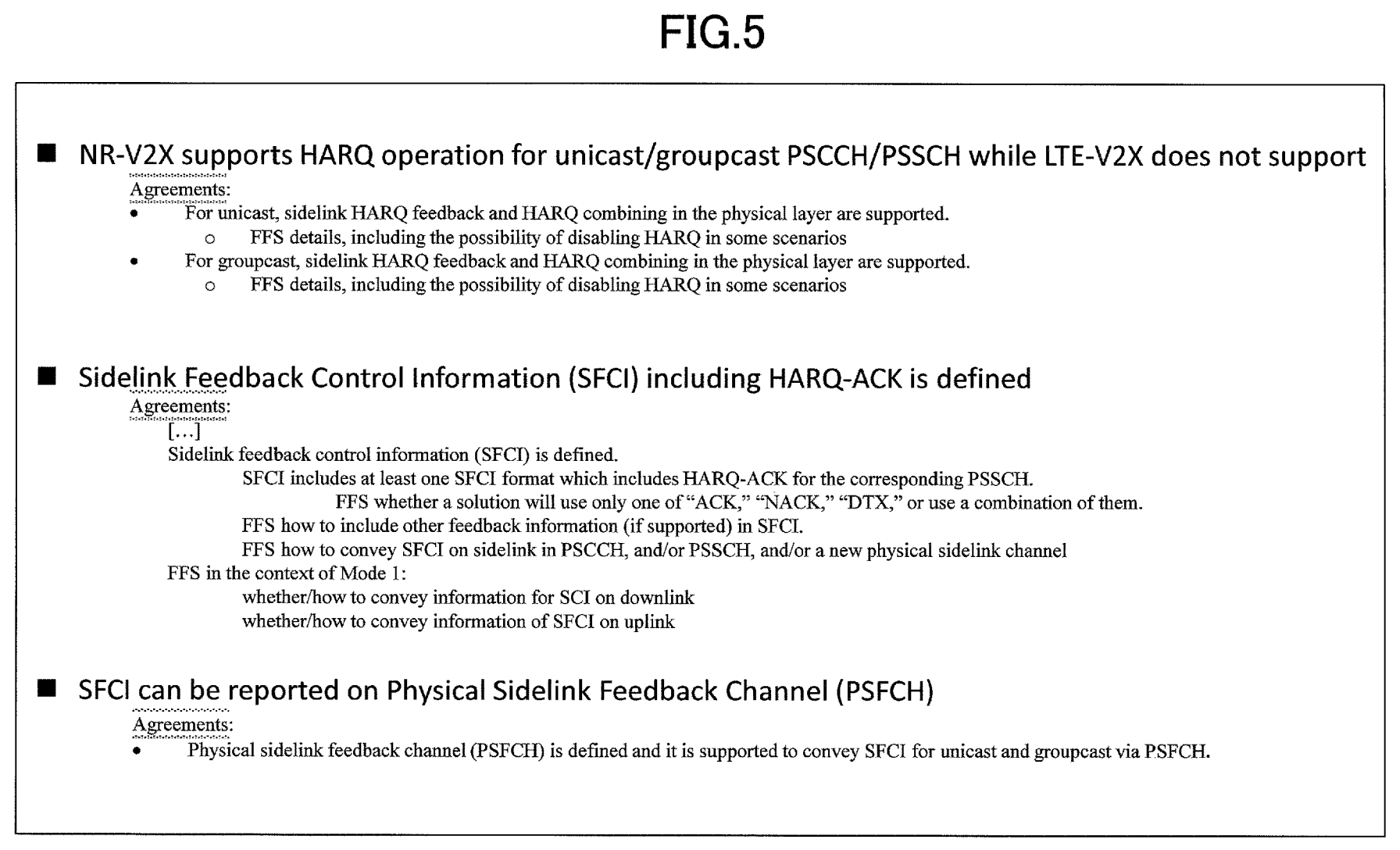

■ NR-V2X supports HARQ operation for unicast/groupcast PSCCH/PSSCH while LTE-V2X does not support Agreements:

● For unicast, sidelink HARQ feedback and HARQ combining in the physical layer are supported.

○ FFS details, including the possibility of disabling HARQ in some scenarios

● For groupcast, sidelink HARQ feedback and HARQ combining in the physical layer are supported.

○ FFS details, including the possibility of disabling HARQ in some scenarios

■ Sidelink Feedback Control Information (SFCI) including HARQ-ACK is defined

Agreements:

[...]

Sidelink feedback control information (SFCI) is defined.

SFCI includes at least one SFCI format which includes HARQ-ACK for the corresponding PSSCH.

FFS whether a solution will use only one of "ACK," "NACK," "DTX," or use a combination of them.

FFS how to include other feedback information (if supported) in SFCI.

FFS how to convey SFCI on sidelink in PSCCH, and/or PSSCH, and/or a new physical sidelink channel FFS in the context of Mode 1:

whether/how to convey information for SCI on downlink whether/how to convey information of SFCI on uplink ■ SFCI can be reported on Physical Sidelink Feedback Channel (PSFCH)

Agreements:

● Physical sidelink feedback channel (PSFCH) is defined and it is supported to convey SFCI for unicast and groupcast via PSFCH.

FIG.8

| | | SR | | CSI+SR | | |
|---|---|---|---|---|---|---|
| | | PF0 | PF1 | PF2 | PF3 | PF4 |
| HARQ-ACK | PF0 | Transmit HARQ-ACK/SR on PF0 for HARQ-ACK | | - If higher layer parameter *simultaneousHARQ-ACK-CSI* is provided, transmit HARQ-ACK/SR/CSI on HARQ-ACK PUCCH resource (*)<br>- Otherwise, CSI is dropped<br>- (**) | | |
| | PF1 | - Transmit HARQ-ACK on PF1 for HARQ-ACK<br>- Drop SR | - Transmit HARQ-ACK on PF1 for HARQ-ACK, for negative SR<br>  • PF1 for SR, for positive SR | | | |
| | PF2 | Transmit HARQ-ACK/SR on HARQ-ACK PUCCH resource (*)(**) | | | | |
| | PF3 | | | | | |
| | PF4 | | | | | |
| CSI | PF2 | Transmit CSI/SR on CSI PUCCH resource () | | - If higher layer parameter multi-CSI-PUCCH-ResourceList with J≤2 PUCCH resources is configured, transmit CSIs on one PUCCH resource in J<br>  If coding rate is over maximum, some CSIs are dropped according to priority order<br>- Otherwise, CSI reports except the highest priority are dropped<br>- () | | |
| | PF3 | | | | | |
| | PF4 | | | | | |

(*) PUCCH resource set is determined by UCI payload size and PUCCH resource is determined by PUCCH resource indicator field in the last DCI, which is the same as PUCCH resource determination for HARQ-ACK after RRC connection setup (**) When K SR occasions are collided, $\lceil \log_2(K + 1) \rceil$ bits are transmitted, which means that only one positive SR is allowed

FIG.13

Basic procedure: UCI in PUCCH is piggybacked on a colliding PUSCH (at least 1-symbol collision)

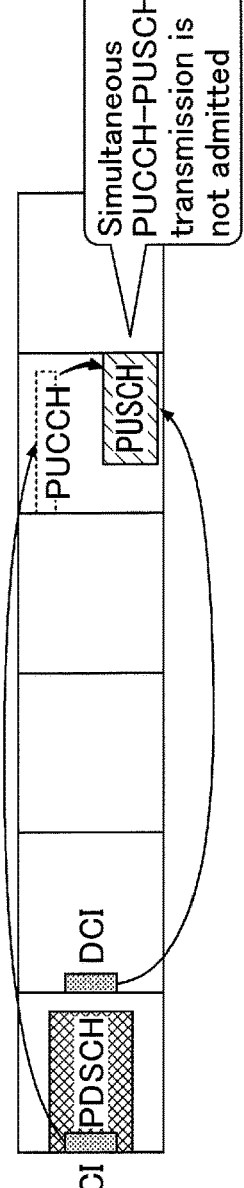

Simultaneous PUCCH-PUSCH transmission is not admitted

DCI scheduling PUSCH + Configured grant PUSCH: UCI is piggybacked on DCI scheduling PUSCH

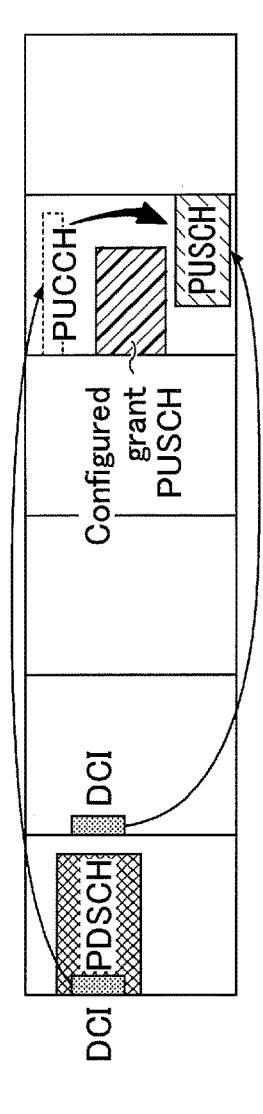

DCI scheduling PUSCHs: UCI is piggybacked on DCI scheduling PUSCH with the smallest ServCellIndex

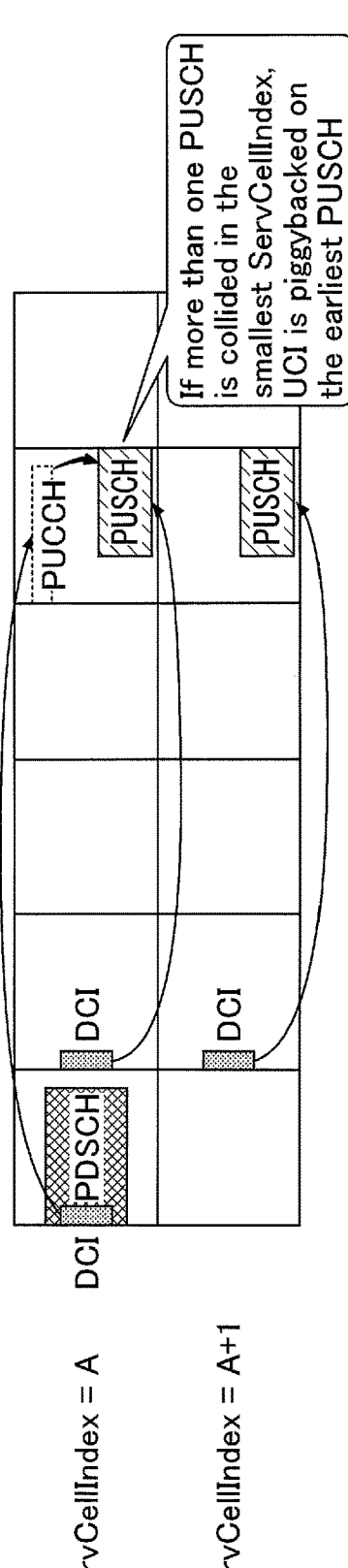

If more than one PUSCH is collided in the smallest ServCellIndex, UCI is piggybacked on the earliest PUSCH ServCellIndex = A ServCellIndex = A+1

COMMUNICATION APPARATUS AND COMMUNICATION METHOD

TECHNICAL FIELD

The present invention relates to a communication apparatus in a wireless communication system.

BACKGROUND ART

In LTE (Long Term Evolution) and successor systems of LTE (for example, LTE-A (LTE Advanced), NR (New Radio) (also referred to as 5G)), a sidelink (which may also be referred to as D2D (Device to Device) technology) in which communication apparatuses such as UEs (communication apparatuses) communicate directly with each other without using a base station has been studied (for example, see Non-Patent Document 1).

Realization of V2X (Vehicle to Everything) is being studied, and V2X is being developed into specifications. V2X is a part of ITS (Intelligent Transport Systems), and as illustrated in FIG. 1, V2X is a general term including V2V (Vehicle to Vehicle) meaning a form of communication performed between vehicles as illustrated in FIG. 1, a V2I (Vehicle to Infrastructure) meaning a form of communication performed between a vehicle and a road-side unit (RSU) installed at a roadside, a V2N (Vehicle to Nomadic device) meaning a form of communication performed between a vehicle and a mobile terminal of a driver, and a V2P (Vehicle to Pedestrian) meaning a form of communication performed between a vehicle and a mobile terminal carried by a pedestrian.

RELATED ART DOCUMENT

Non-Patent Document

Non-Patent Document 1: 3GPP TS 36.213 V14.3.0 (2017-06)

SUMMARY OF THE INVENTION

Problem to be Solved by the Invention

Inter-terminal direct communication channels used in inter-terminal direct communication (side link technique) include the following channels.

A channel for transmitting control information such as SCI (Sidelink Control Information) is referred to as a PSCCH (Physical Sidelink Control Channel), and a channel for transmitting data is referred to as a PSSCH (Physical Sidelink Shared Channel). In addition, in NR-based V2X, it is specified to support HARQ (Hybrid Automatic Repeat Request) operation for PSCCH and PSCCH, and Sidelink Feedback Control Information (SFCI) including HARQ-ACK is defined. SFCI is transmitted on Physical Sidelink Feedback Channel (PSFCH), but PSFCH may overlap another PSFCH, PSCCH, or PSSCH. The names of the channels are not limited thereto. In the present disclosure, "a plurality of channels overlap each other" may mean that the same resource is used at least at some point in time (for example, symbol), a frequency (for example, resource block), and a code (for example, orthogonal cover code), or may mean that the resource is used at least at some point in time.

The present invention has been made in view of the above issues, and it is an object of the present invention to provide a technique for appropriately controlling transmission in each channel in a case where PSFCH overlaps another inter-terminal direct communication channel. The present invention is not limited to inter-terminal communication of V2X, and may be applied to any terminal.

Means for Solving Problem

According to the technique of the present disclosure, provided is a communication apparatus including a transmitting unit configured to transmit an SFCI (Sidelink Feedback Control Information) including a HARQ (Hybrid Automatic Repeat Request) response on a PSFCH (Physical Sidelink Feedback Channel), and a control unit configured to, in a case where the PSFCH and another inter-terminal direct communication channel overlap, perform control to transmit the SFCI by multiplexing the SFCI with the another inter-terminal direct communication channel.

According to another aspect of the technique of the present disclosure, provided is a communication apparatus including a transmitting unit configured to transmit an SFCI (Sidelink Feedback Control Information) including a HARQ (Hybrid Automatic Repeat Request) response on a PSFCH (Physical Sidelink Feedback Channel), and a control unit configured to, in a case where the PSFCH and another inter-terminal direct communication channel overlap, perform control to transmit the PSFCH and the another inter-terminal direct communication channel simultaneously.

According to another aspect of the technique of the present disclosure, provided is a communication apparatus including a transmitting unit configured to transmit an SFCI (Sidelink Feedback Control Information) including a HARQ (Hybrid Automatic Repeat Request) response on a PSFCH (Physical Sidelink Feedback Channel), and a control unit configured to, in a case where the PSFCH and another inter-terminal direct communication channel overlap, perform control to transmit the PSFCH and the another inter-terminal direct communication channel by time-division multiplexing the PSFCH with the another inter-terminal direct communication channel.

According to another aspect of the technique of the present disclosure, provided is a communication apparatus including a transmitting unit configured to transmit an SFCI (Sidelink Feedback Control Information) including a HARQ (Hybrid Automatic Repeat Request) response on a PSFCH (Physical Sidelink Feedback Channel), and a control unit configured to, in a case where the PSFCH and another inter-terminal direct communication channel overlap, perform control so as not to transmit any one of the PSFCH and the another inter-terminal direct communication channel.

According to another aspect of the technique of the present disclosure, provided is a communication apparatus including a transmitting unit configured to transmit an SFCI (Sidelink Feedback Control Information) including a HARQ (Hybrid Automatic Repeat Request) response on a PSFCH (Physical Sidelink Feedback Channel), and a control unit configured to, in a case where the PSFCH and another inter-terminal direct communication channel overlap, perform any one of, depending on a situation, a control to transmit the SFCI by multiplexing the SFCI with the another inter-terminal direct communication channel, a control to transmit the PSFCH and the another inter-terminal direct communication channel simultaneously, a control to transmit the PSFCH and the another inter-terminal direct communication channel by time-division multiplexing the PSFCH with the another inter-terminal direct communication channel, and a control so as not to transmit one of the PSFCH and the another inter-terminal direct communication channel.

Effect of the Invention

According to the technique of the present disclosure, a technique for appropriately controlling transmission in each channel in a case where PSFCH overlaps another inter-terminal direct communication channel is provided.

BRIEF DESCRIPTION OF DRAWINGS

FIG. 3 is a drawing for explaining SL transmission mode in NR-V2X;

FIG. 5 is a drawing for explaining HARQ, SFCI, PSFCH in NR-V2X;

FIG. 8 is a drawing for explaining handling of a plurality of UCI types in PUCCH;

FIG. 13 is a drawing summarizing handling of UCI on PUSCH;

MODE FOR CARRYING OUT THE INVENTION

One or more embodiments of the present invention will be hereinafter described with reference to drawings. The embodiment described below is an example, and the embodiment to which the present invention is applied is not limited to the following embodiment.

<Overview of Sidelink Transmission>

In the present embodiment, since sidelink is a basis technology, first, as a basic example, overview of sidelink will be explained.

Figure 1:
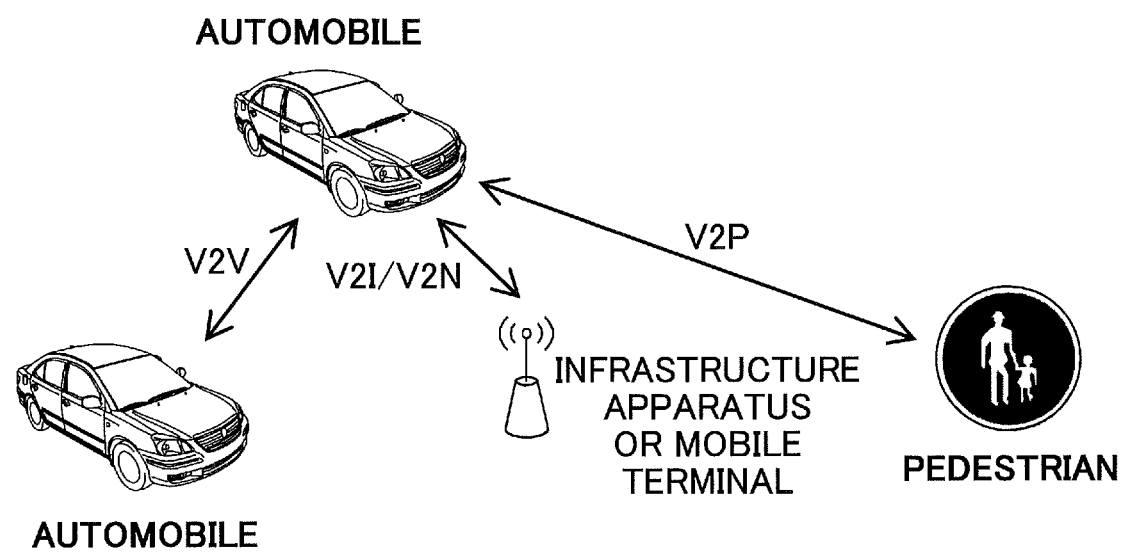
FIG. 1 is a drawing for explaining V2X.
Figure 2:
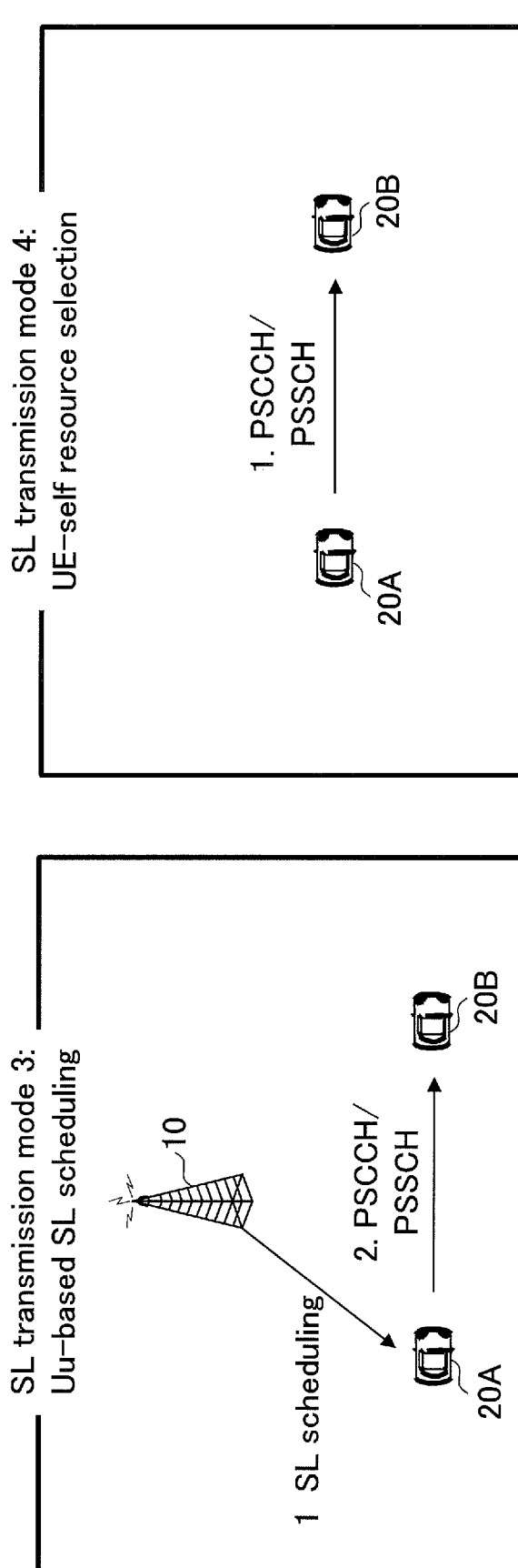
FIG. 2 is a drawing for explaining SL transmission mode in LTE-V2X.

FIG. 2 is a drawing for explaining a sidelink transmission mode in LTE-V2X.

In sidelink transmission mode 3 of LTE-V2X, a user equipment 20A transmits PSCCH/PSSCH to a user equipment 20B on the basis of SL scheduling by the base station apparatus 10. In sidelink transmission mode 4, the user equipment 20A transmits PSCCH/PSSCH to the user equipment 20B on the basis of a resource selection made by the user equipment 20A.

In a case where a user equipment is collectively referred to, a user equipment may be referred to as a user equipment 20.

FIG. 3 is a drawing for explaining sidelink transmission mode of NR-V2X.

In sidelink transmission mode 1 of NR-V2X, like the sidelink transmission mode 3 of LTE-V2X, the user equipment 20A transmits PSCCH/PSSCH to the user equipment 20B on the basis of SL scheduling by the base station apparatus 10.

In sidelink transmission mode 2 of NR-V2X, PSCCH/PSSCH is transmitted on the basis of a resource selection made by the user equipment itself. The sidelink transmission mode 2 of NR-V2X is further divided, and in the sidelink transmission mode (2a) of NR-V2X, the user equipment 20A transmits PSCCH/PSSCH to the user equipment 20B on the basis of a resource selection made by the user equipment 20A itself, and the user equipment 20B transmits PSCCH/PSSCH to the user equipment A on the basis of a resource selection made by the user equipment 20B itself. In the sidelink transmission mode (2c) of NR-V2X, the user equipment 20A transmits PSSCH to the user equipment 20B in accordance with a grant indicated by the base station apparatus 10 or configured by a specification (Configured-grant). In the sidelink transmission mode (2d) of NR-V2X, the user equipment 20A performs scheduling for the user equipment 20B by transmitting PSCCH to the user equipment 20B, and the user equipment 20B transmits PSSCH to the user equipment 20A on the basis of the scheduling.

Figure 4:
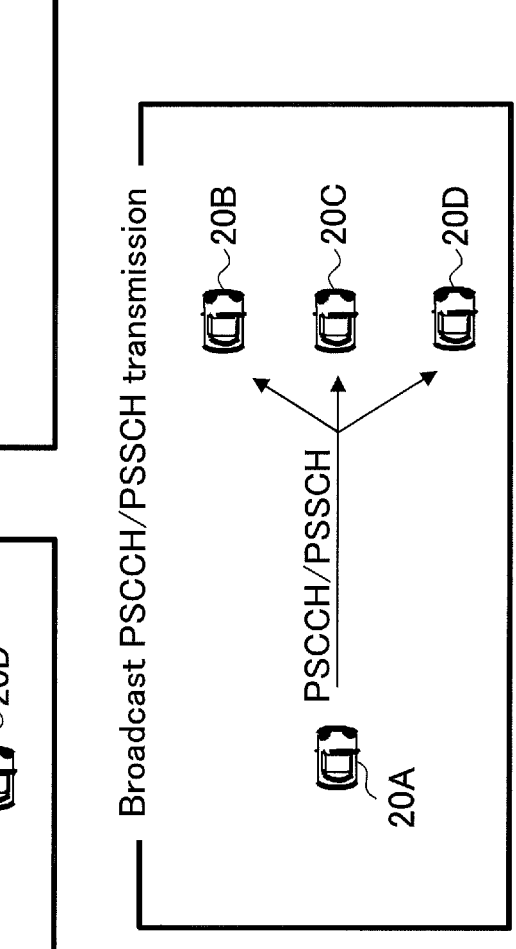
FIG. 4 is a drawing for explaining a communication type in NR-V2X.

FIG. 4 is a drawing for explaining a communication type (Unicast, Groupcast, Broadcast) in NR-V2X. In Unicast transmission, a user equipment 20A transmits PSCCH/PSSCH to each of a user equipment 20B and a user equipment 20C. In Groupcast transmission, a user equipment 20A transmits PSCCH/PSSCH to a group including a user equipment 20B and a user equipment 20C. In Broadcast transmission, a user equipment 20A broadcasts PSCCH/PSSCH to a user equipment 20B, a user equipment 20C, and a user equipment 20D.

(HARQ operation in NR-V2X) HARQ operation in NR-V2X will be explained.

FIG. 5 is a drawing for explaining HARQ, SFCI, PSFCH in NR-V2X.

In NR-V2X, it has been agreed to support HARQ operation for PSCCH/PSSCH transmission in unicast and groupcast. A Sidelink Feedback Control Information (SFCI) including HARQ-ACK is defined. SFCI is transmitted on Physical Sidelink Feedback Channel (PSFCH).

(Problems)

Figure 6:
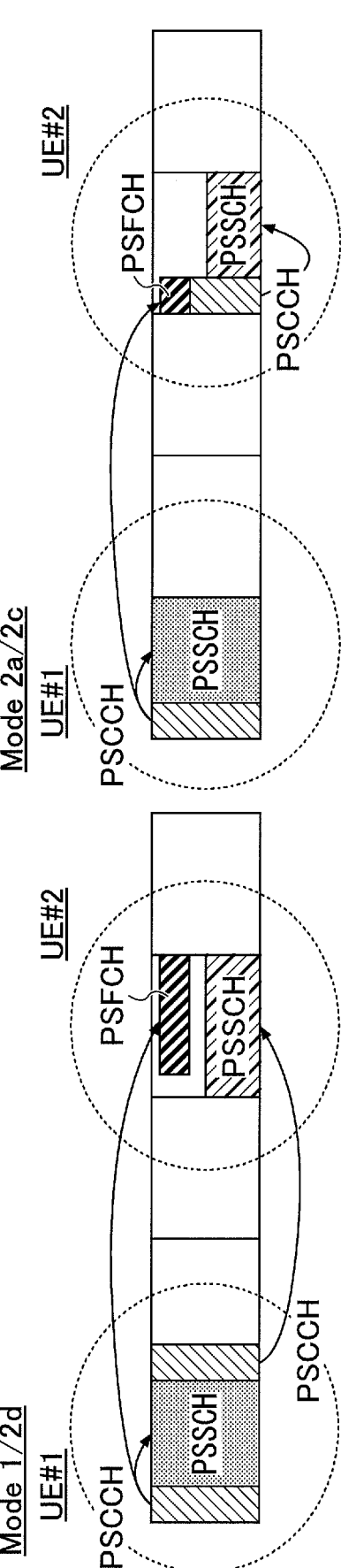
FIG. 6 is a drawing for explaining a problem.

FIG. 6 is a drawing for explaining problems.

As illustrated in FIG. 6, in sidelink transmission modes 1 and 2d of NR-V2X, a transmission of feedback information PSFCH from a user equipment #2 in response to PSCCH transmitted from a user equipment #1 might overlap a transmission of PSCCH from the user equipment #2 in response to a transmission of PSCCH from the user equipment #1. In sidelink transmission modes 1 and 2d of NR-V2X, a transmission of feedback information PSFCH from the user equipment #2 in response to PSCCH transmitted from the user equipment #1 might overlap a transmission of PSCCH/PSSCH from the user equipment #2.

Embodiment 1

Figure 7:
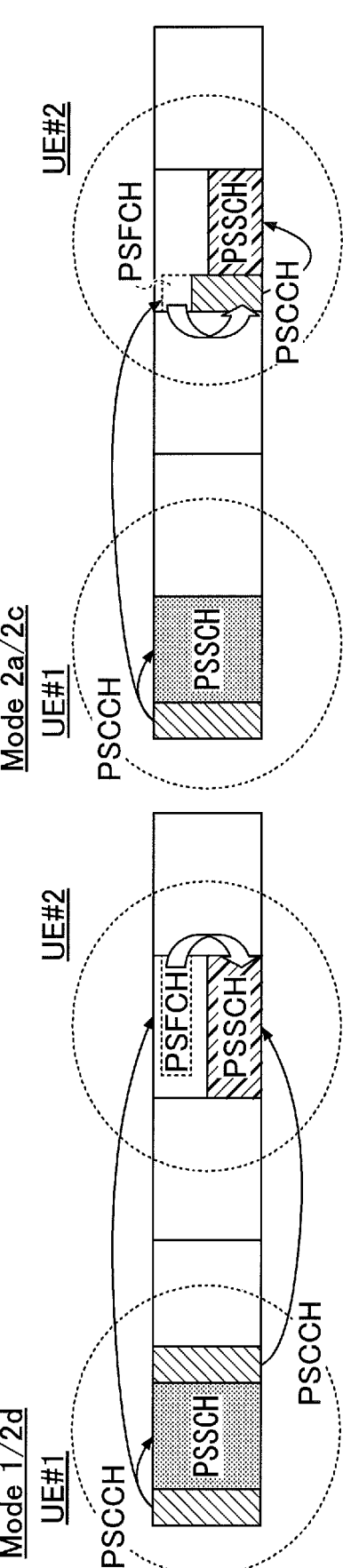
FIG. 7 is a drawing for explaining an operation example according to an embodiment 1.

FIG. 7 is a drawing for explaining an operation example according to the embodiment 1.

In the embodiment 1, as illustrated in FIG. 7, in a case where a channel of PSFCH overlaps another channel such as PSFCH, PSCCH, or PSSCH, an SFCI included in the PSFCH overlapping the another PSFCH/PSCCH/PSSCH is multiplexed with the another PSFCH/PSCCH/PSSCH. All or some of information included in the overlapping channel may be multiplexed with another new PSFCH/PSCCH/PSSCH.

Embodiment 1-1

More specifically, in a case where PSFCH overlaps another PSFCH, an SFCI included in a PSFCH and an SFCI included in another PSFCH are multiplexed with a single PSFCH.

Embodiment 1-1A

For example, according to a configuration specified in advance, SFCIs included in a plurality of PSFCHs may be multiplexed with a PSFCH having a larger capacity, may be multiplexed with a PSFCH of which a start symbol is earlier or later, or may be multiplexed with a PSFCH of which an index of a subcarrier, a resource block, or a subchannel is smaller or larger.

Embodiment 1-1B

For example, in a case where a format of PSFCH is substantially the same as a format of PUCCH, a PSFCH used for multiplexing may be selected in the same manner as a mechanism where PUCCH overlaps.

Embodiment 1-2

In a case where a PSFCH overlaps a PSCCH/PSSCH, an SFCI included in the PSFCH may be piggybacked on the PSCCH/PSSCH. In other words, the SFCI included in the PSFCH may be multiplexed with the PSCCH/PSSCH.

Embodiment 1-2A

Figure 15:
FIG. 15 is a drawing for explaining UCI on PUSCH.

Piggybacking of an SFCI on PSCCH/PSSCH may be performed in the same manner as piggybacking of an UCI on PUSCH. For example, a mapping procedure of an SFCI to a PSCCH/PSSCH may be performed in a manner substantially the same as mapping procedure of a UCI to a PUCCH (FIG. 15). More specifically, in a case where a HARQ-ACK length is two bits or more, first, a HARQ-ACK is mapped to a symbol immediately behind a demodulation reference signal (DM-RS), and subsequently, CSI are mapped in order from the first symbol of PSCCH/PSSCH, and then, information of PSCCH/PSSCH is mapped to the remaining resources.

Embodiment 1-2B

Puncturing and rate matching may be applied to overlapping resources. For example, puncturing is applied to PSFCH transmission or PSCCH/PSSCH transmission on an overlapping resource. It should be noted that "puncturing" means that, in a coding of a punctured channel, coding is performed based on the assumption that an assigned resource can be used, but the "puncturing" may also mean that a coding symbol is not mapped to an actually unavailable resource (i.e., a resource is kept vacant). In other words, after a punctured channel is mapped, it is overwritten by a puncturing channel. Rate matching may mean to control the number of coded bits (coding bits) in view of actually available radio resources. More specifically, the coding rate of data is controlled according to the amount of resources that become unavailable due to overlapping.

Whether puncturing or rate matching is applied or not may be indicated via, for example, an SCI.

A resource to which puncturing or rate matching is applied may be indicated via, for example, an SCI.

(Handling of Multiple UCI Types)

FIG. 8 is a drawing for explaining handling of multiple UCI types in PUCCH.

As illustrated in FIG. 8, uplink control information (UCI) of PUCCH includes HARQ-ACK, SR (Scheduling Request), CSI (Channel State Information). A format of PUCCH includes a format 0 (PF0), a format 1 (PF1), a format 2 (PF2), a format (PF3), and a format 4 (PF4).

Figure 9:
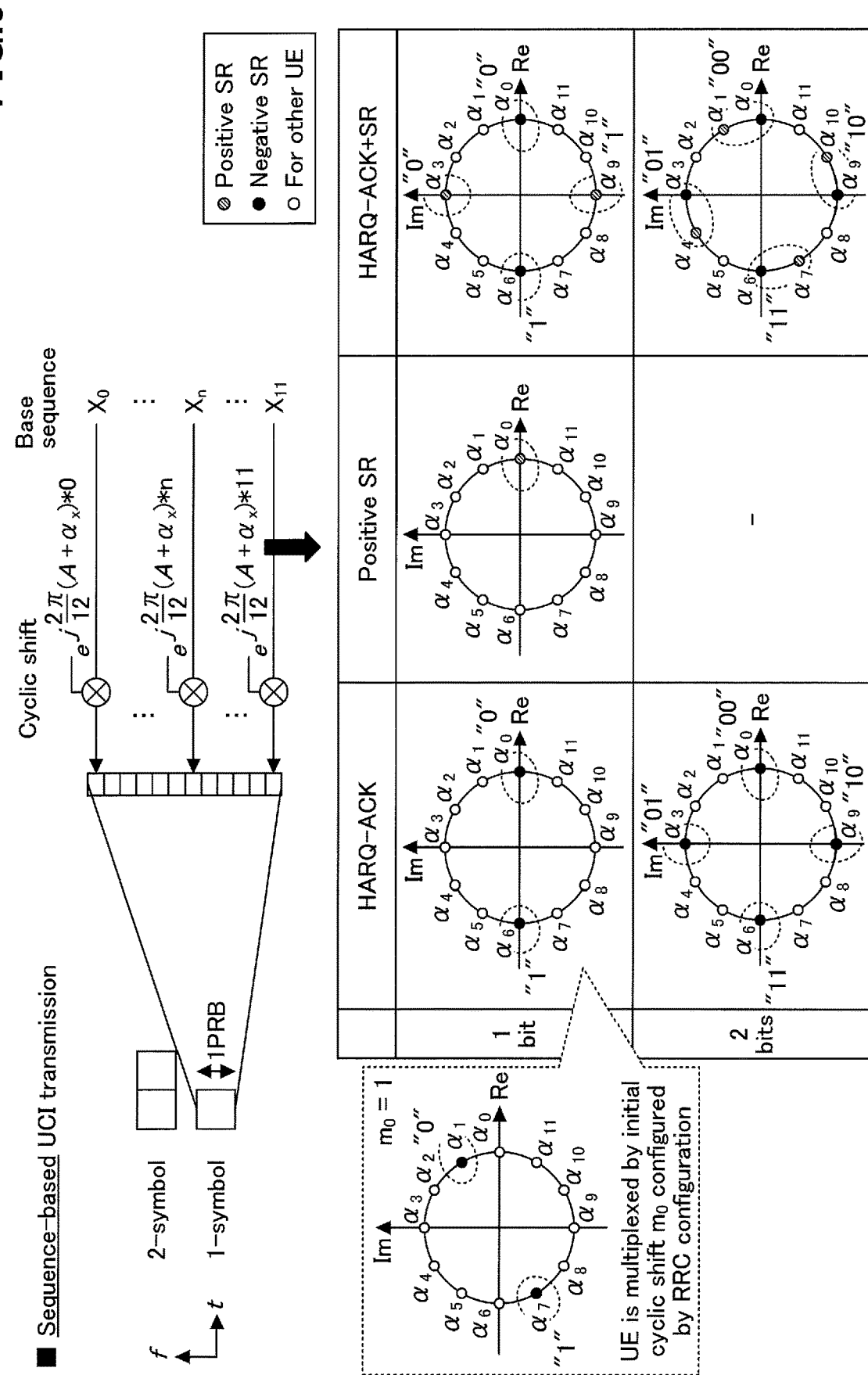
FIG. 9 is a drawing for explaining a format 0 of PUCCH.

FIG. 9 is a drawing for explaining a format 0 of PUCCH.

Figure 10:
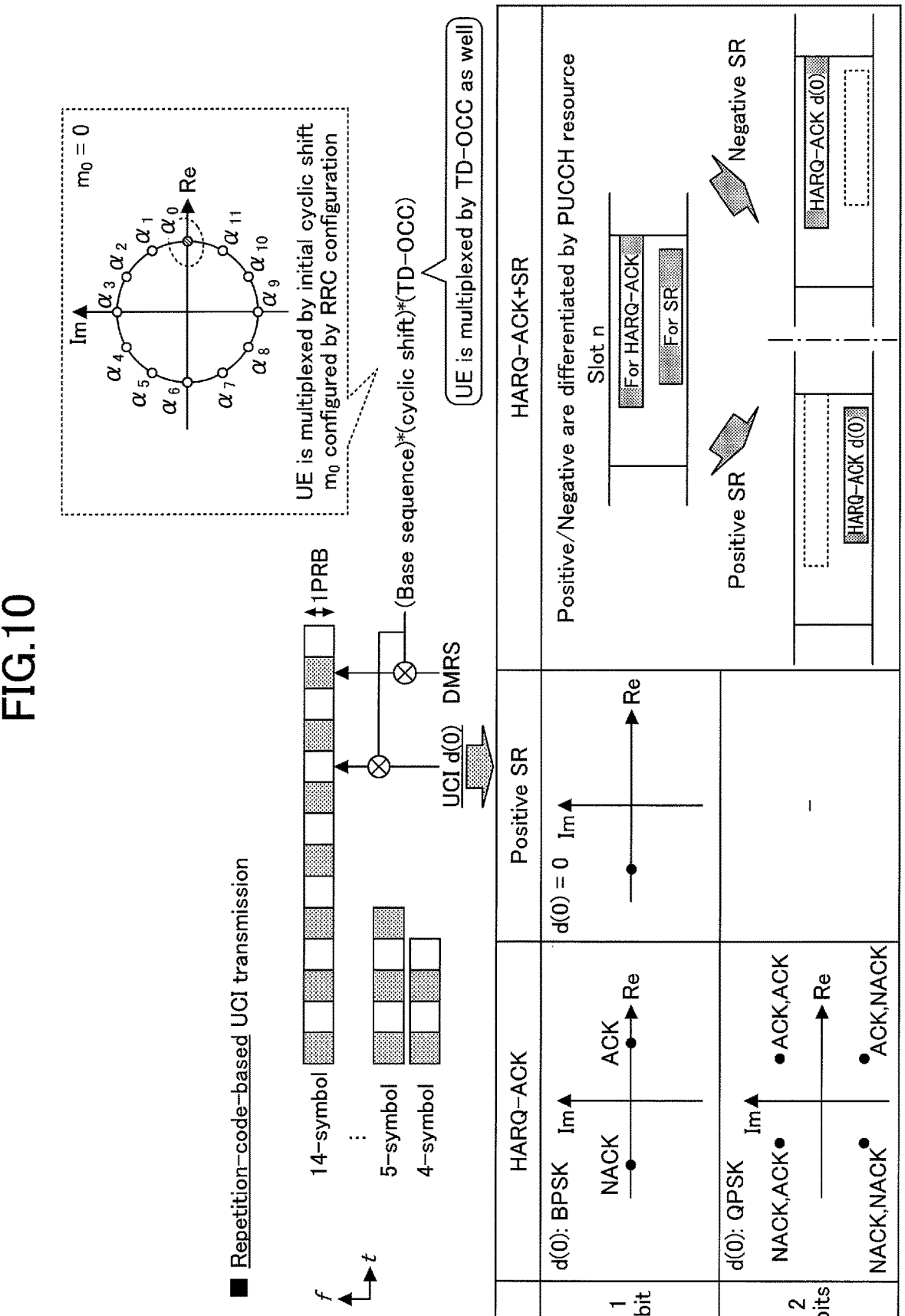
FIG. 10 is a drawing for explaining a format 1 of PUCCH.

FIG. 10 is a drawing for explaining a format 1 of PUCCH.

Figure 11:
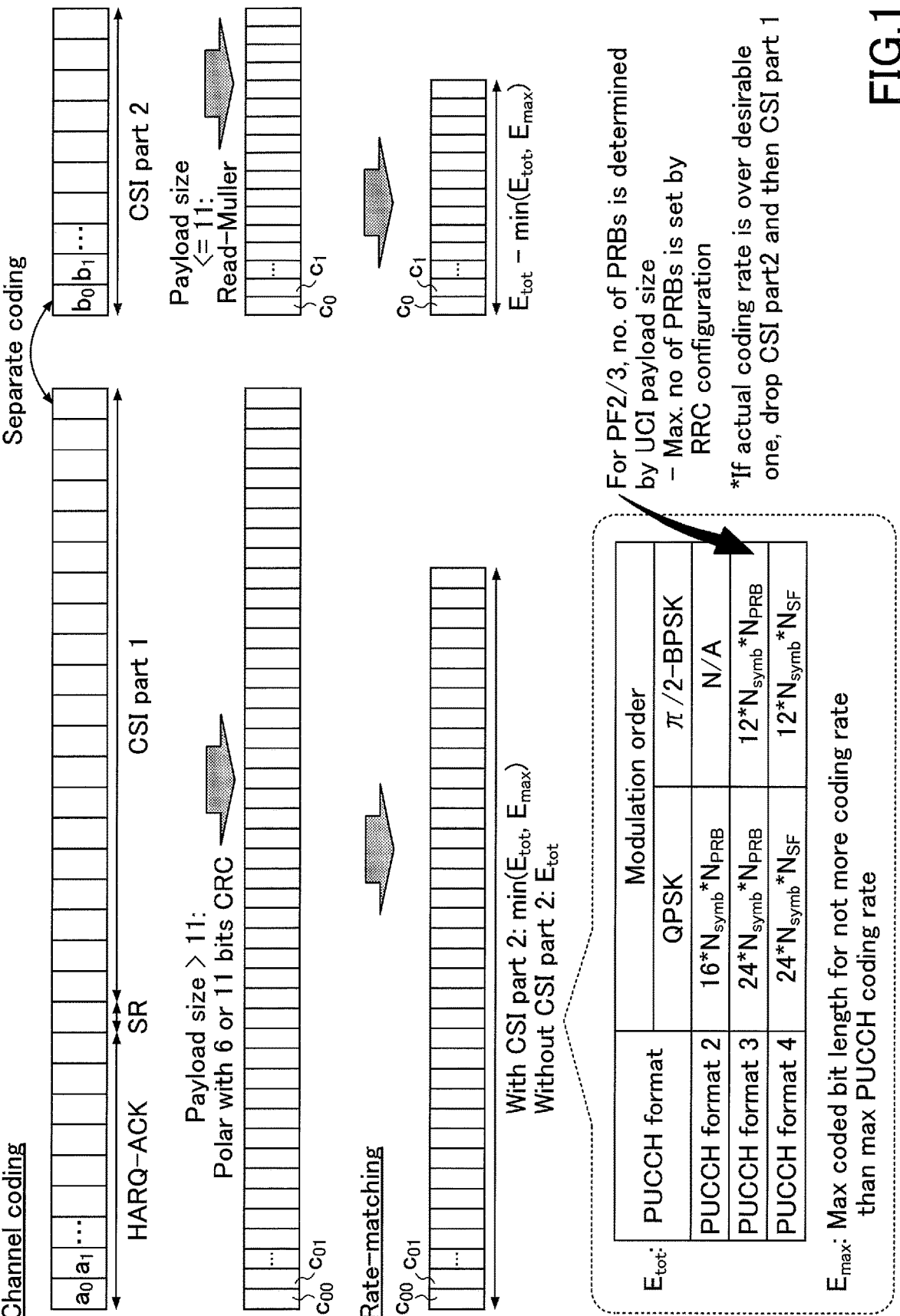
FIG. 11 is a drawing for explaining formats 2/3/4 of PUCCH.

FIG. 11 is a drawing for explaining coding and rate matching in formats 2/3/4 of PUCCH.

Figure 12:
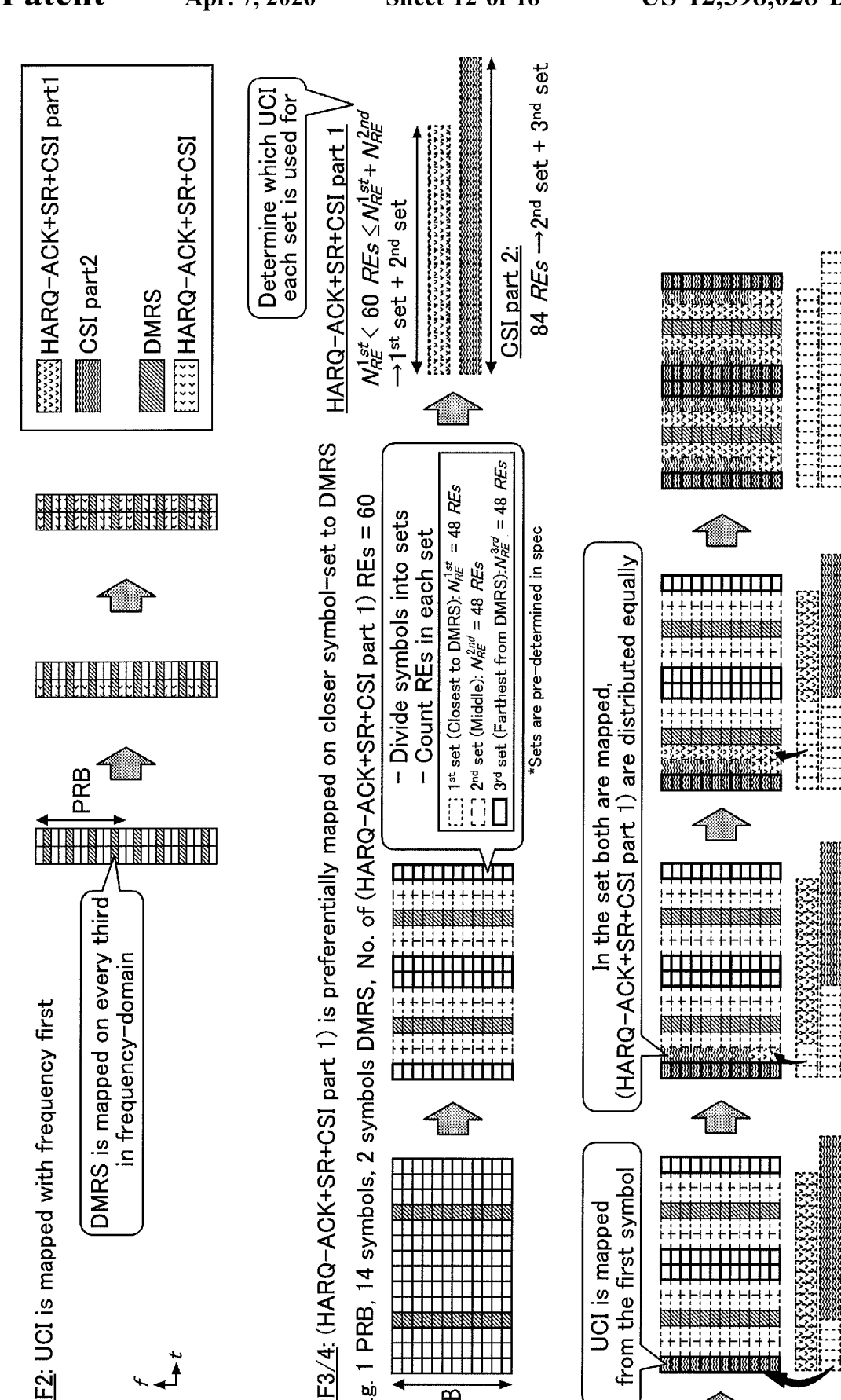
FIG. 12 is a drawing for explaining formats 2/3/4 of PUCCH.

FIG. 12 is a drawing for explaining multiplexing procedure in formats 2/3/4 of PUCCH.

FIG. 13 is a drawing summarizing handling of UCI on PUSCH.

Figure 14:
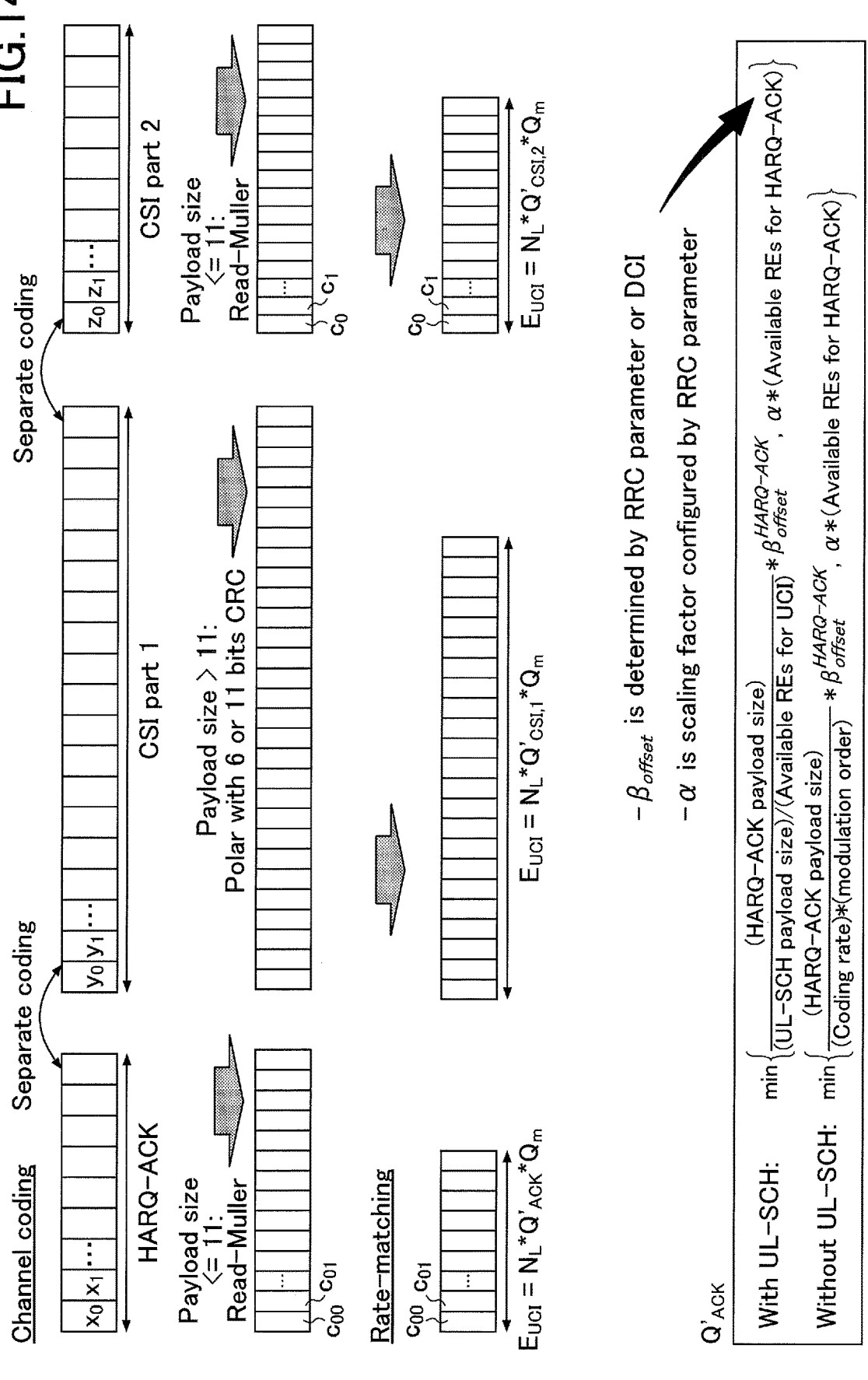
FIG. 14 is a drawing for explaining UCI on PUSCH.

FIG. 14 is a drawing for explaining coding/rate matching of UCI on PUSCH.

FIG. 15 is a drawing for explaining multiplexing procedure of UCI on PUSCH.

In this way, in the embodiment 1, processing performed in a case where PSFCH overlaps can be considered to be performed in the same manner as processing performed in a case where PUCCH overlaps.

For example, in a case where a format substantially the same as PUCCH is used as a format of PSFCH, the explanation given in FIG. 8 to FIG. 12 can be considered to be adopted as an explanation about PSFCH. For example, a PUCCH format and a PSFCH format may be partially the same. For example, in a case where HARQ-ACK, and/or CSI, and/or SR are/is multiplexed, and the information bit length is more than 2 bits, i.e., multiplexing is performed with a PSFCH resource in a PSFCH format corresponding to a PUCCH format 2, a PUCCH format 3, or a PUCCH format 4, the information bit may be transmitted in a PSFCH resource for HARQ-ACK transmission.

A method for piggybacking a UCI included in a PUCCH on a PUSCH in a case where the PUCCH overlaps the PUSCH may be adopted as a method for piggybacking an SFCI included in a PSFCH on a PSCCH/PSSCH in a case where the PSFCH overlaps the PSCCH/PSSCH. For example, the explanation given in FIG. 13 to FIG. 15 can be adopted as explanation about piggybacking of SFCI on PSCCH/PSSCH.

According to the embodiment 1, multiple overlapping channels can be transmitted by being aggregated into a single channel, so that distortion of a transmission signal caused by simultaneous transmission of multiple different channels can be avoided. Therefore, the flexibility of scheduling can be increased. In addition, the receiving side does not have to apply reception processing to multiple channels, which can simplify the operation at the receiving side.

Embodiment 2

Figure 16:
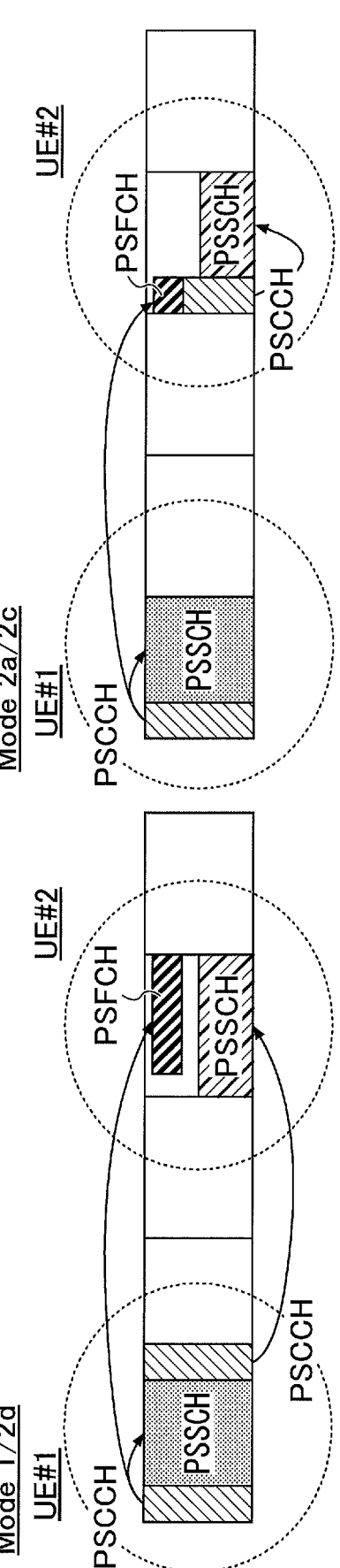
FIG. 16 is a drawing for explaining an operation example according to an embodiment 2.

FIG. 16 is a drawing for explaining an operation example of the embodiment 2.

In the embodiment 2, as illustrated in FIG. 16, in a case where a PSFCH overlaps another PSFCH/PSCCH/PSSCH, two or more channels are transmitted simultaneously.

In a case where a transmission of PSFCH overlaps a transmission of another PSFCH/PSCCH/PSSCH (more specifically, transmission timings of the PSFCH and the PSCCH overlap each other but resources of the PSFCH and the PSCCH do not overlap each other), the user equipment transmits the PSFCH and the another PSFCH/PSCCH/PSSCH simultaneously.

Embodiment 2A

For example, when the PSFCH and the another PSFCH/PSCCH/PSSCH are transmitted simultaneously, a transmission power for each channel may be calculated according to a ratio of resource blocks scheduled for each channel.

Embodiment 2B

For example, channels may be prioritized from the highest to the lowest in the following order: PSCCH, PSFCH, and PSSCH. In other words, transmission powers are first assigned to channels of higher priority, and a remaining transmission power may be assigned to a channel of lower priority. It should be noted that the order of priority is not limited thereto.

Embodiment 2C

For example, in a case where overlapping between PSCCH/PSFCH/PSSCH occurs, power boosting (boosting of transmission power) based on power spectral density (PSD) and the like may be configured for PSCCH/PSFCH. A boosting transmission power may be specified by a technical specification, or may be configured in advance. A transmission power before boosting may be specified by a specification, or may be specified on the basis of indicated information (for example, an SCI).

For example, in a case where a PSFCH and a PSCCH overlaps each other, the power spectral density for PSFCH may be boosted by x dB.

In a case where a PSFCH and a PSSCH overlaps, the power spectral density for PSFCH may be boosted by y dB.

In a case where a PSCCH and a PSSCH, the power spectral density for PSCCH may be boosted by z dB.

According to the embodiment 2, transmission can be performed without changing mapping and coding rates of multiple channels, and processing at the transmission side can be simplified. Accordingly, the flexibility of scheduling can be increased. In addition, with appropriate power control, degradation of communication quality caused by simultaneous transmission can be avoided.

Embodiment 3

In the embodiment 3, PSFCH/PSCCH/PSSCH is transmitted by using time division multiplexing. More specifically, a terminal does not assume overlapping of PSFCH, PSCCH, and PSSCH.

In this case, symbols of channels do not overlap each other.

According to the embodiment 3, multiple channels do not overlap, and therefore, operations on the transmission side and the reception side can be simplified. Each channel can be transmitted with a sufficient transmission power.

Embodiment 4

In the embodiment 4, in a case where a PSFCH overlaps another PSFCH/PSCCH/PSSCH, one of the overlapping channels is transmitted, and another of the overlapping channels is dropped (i.e., not transmitted). Which of the channels is to be transmitted may be defined in advance, or determined on the basis of indicated information (for example, SCI).

According to the embodiment 4, multiple channels do not overlap, and therefore, operations on the transmission side and the reception side can be simplified. In addition, scheduling in which multiple channels overlap each other is allowed, and therefore, the flexibility of scheduling can be increased.

Embodiment 5

In the embodiment 5, in a case where a PSFCH overlaps another PSFCH/PSCCH/PSSCH, processing according to a situation is executed.

Embodiment 5A

In a case where a PSFCH overlaps another PSFCH/PSCCH/PSSCH, processing according to a channel may be executed.

For example, in a case where overlapping channels are a PSFCH and a PSSCH, processing of the embodiment 1 may be executed, and in a case where overlapping channels are a PSFCH and a PSCCH, processing of the embodiment 3 may be executed, and in a case where overlapping channels are a PSCCH and a PSSCH, processing of the embodiment 2 may be executed.

Embodiment 5B

In a case where a PSFCH overlaps another PSFCH/PSCCH/PSSCH, processing according to a communication type (unicast, groupcast, and broadcast) may be executed.

For example, in a case where a PSFCH transmitting a HARQ-ACK corresponding to a PSSCH of unicast overlaps a PSSCH of unicast, processing of the embodiment 1 may be executed, and in a case where a PSFCH transmitting a HARQ-ACK corresponding a PSSCH of unicast overlaps a PSSCH of groupcast, processing of the embodiment 2 may be executed.

Embodiment 5C

In a case where a PSFCH overlaps another PSFCH/PSCCH/PSSCH, processing according to a type of SFCI may be executed.

For example, in a case where an SFCI includes a HARQ-ACK, processing of the embodiment 1 is executed, and in a case where an SFCI does not include a HARQ-ACK, processing of the embodiment 4 may be executed.

Embodiment 5D

In a case where a PSFCH overlaps another PSFCH/PSCCH/PSSCH, processing according to the transmission power of the user equipment may be executed.

Embodiment 5E

In a case where a PSFCH overlaps another PSFCH/PSCCH/PSSCH, processing according to a parameter of an upper layer may be executed.

For example, in a case where "simultaneous-PSFCH-PSSCH" is provided as a parameter of an upper layer instructing simultaneous transmission of a PSFCH and a PSSCH, processing of the embodiment 2 is executed, and in a case where "simultaneous-PSFCH-PSSCH" is not provided, processing of the embodiment 1 may be executed.

According to the embodiment 5, among the effects of the embodiments 1 to 4, the most preferable effect for each situation can be achieved. For example, in the embodiment 5C, different embodiments can be used according to situations, such that the embodiment 3 is applied to a HARQ-ACK transmission of higher priority to transmit the HARQ-ACK transmission with a sufficient transmission power, and the embodiment 4 is applied to a CSI transmission of lower priority so as to simplify the operation of the terminal.

<Apparatus Configuration>

Next, an example of functional configuration of the base station apparatus 10 and the user equipment 20 that execute the processing and operations described so far will be described. The base station apparatus 10 and the user equipment 20 include a function for implementing the above-described embodiments. However, each of the base station apparatus 10 and the user equipment 20 may have only some of the functions in the embodiment.

<Base Station Apparatus 10>

Figure 17:
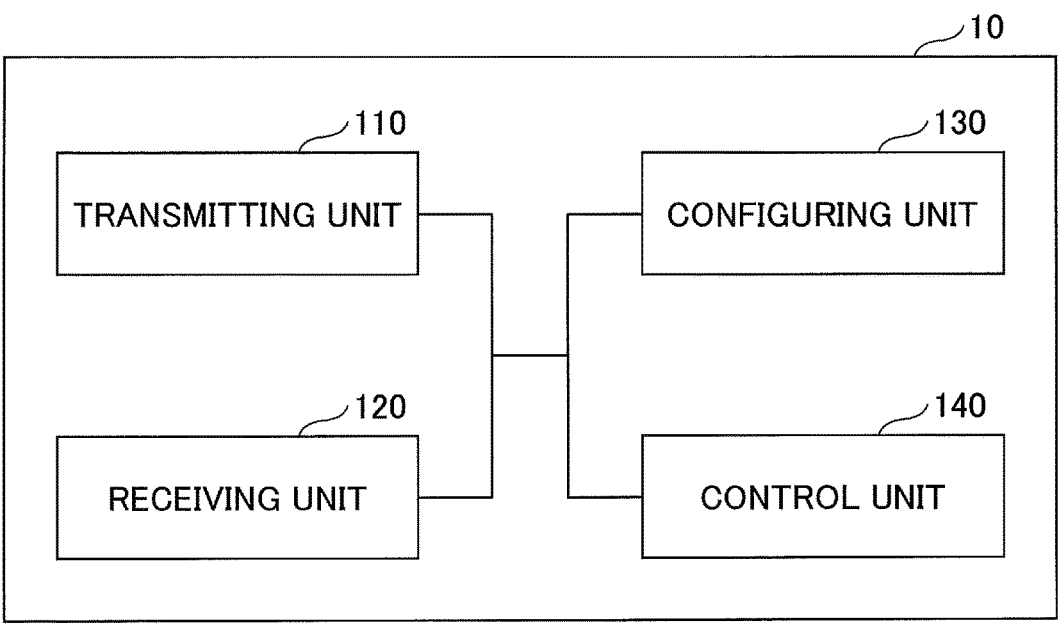
FIG. 17 is a drawing illustrating an example of a functional configuration of a base station apparatus 10 according to an embodiment.

FIG. 17 is a drawing illustrating an example of a functional configuration of the base station apparatus 10. As illustrated in FIG. 17, the base station apparatus 10 includes a transmitting unit 110, a receiving unit 120, a configuring unit 130, and a control unit 140. The functional configuration illustrated in FIG. 17 is only an example. As long as the operation according to the embodiment of the present invention can be executed, the functions may be divided in any way, and the functional units may be given any names.

The transmitting unit 110 includes a function of generating signals to be transmitted to the user equipment 20 and wirelessly transmitting the signals. Also, the transmitting unit 110 transmits information about SL scheduling and the like to the user equipment 20. The receiving unit 120 includes a function of receiving various types of signals transmitted from the user equipment 20 and acquiring, for example, information on a higher layer from the received signals.

The configuring unit 130 stores configuration information configured in advance and various configuration information to be transmitted to the user equipment 20 in a storage device and reads out the configuration information from the storage device as needed. The contents of the configuration information is, for example, information about configuration of V2X and the like.

As explained in the embodiment, the control unit 140 performs processing related to configuration with which the user equipment 20 performs V2X. A functional unit configured to transmit signals in the control unit 140 may be included in the transmitting unit 110, and a functional unit configured to receive signals in the control unit 140 may be included in the receiving unit 120.

<User Equipment 20>

Figure 18:
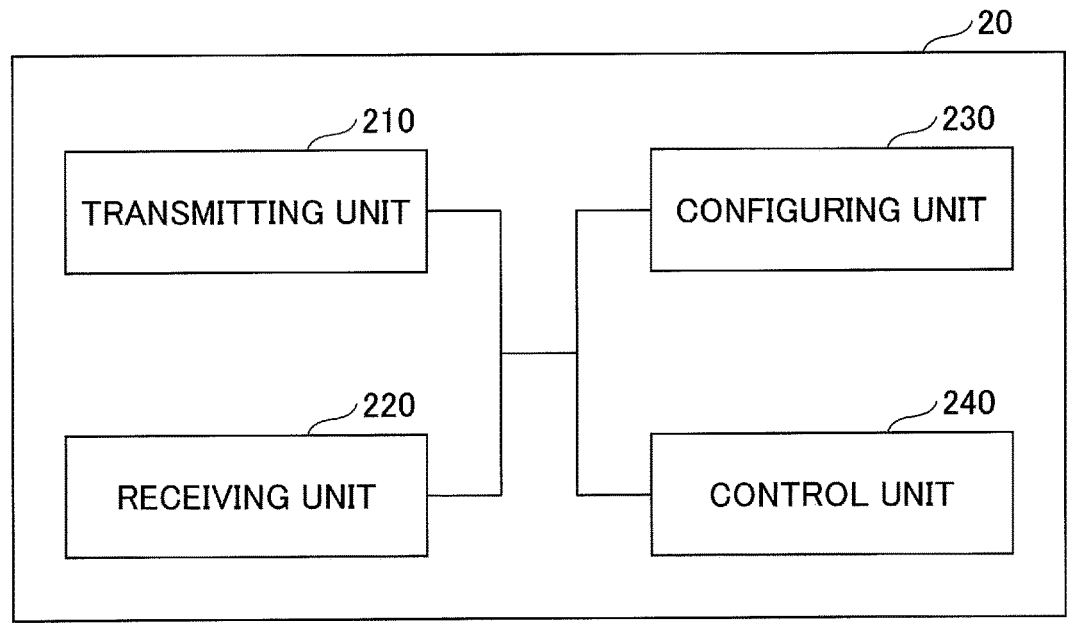
FIG. 18 is a drawing illustrating an example of a functional configuration of a communication apparatus 20 according to an embodiment.

FIG. 18 is a drawing illustrating an example of a functional configuration of the user equipment 20. As illustrated in FIG. 18, the user equipment 20 includes a transmitting unit 210, a receiving unit 220, a configuring unit 230, and a control unit 240. The functional configuration illustrated in FIG. 18 is merely an example. As long as the operation according to the embodiment of the present invention can be executed, the functions may be divided in any way, and the function units may be given any names.

The transmitting unit 210 generates a transmission signal from transmission data and wirelessly transmits the transmission signal. The receiving unit 220 wirelessly receives various types of signals, and acquires a signal in a higher-layer from the received signal in the physical layer. Also, the receiving unit 220 has a function of receiving SL scheduling that is transmitted from the base station apparatus 10. For example, the transmitting unit 210 transmits PSFCH/PSCCH/PSSCH and the like, as V2X, to another user equipment 20, and the receiving unit 120 receives PSFCH/PSCCH/PSSCH and the like from another user equipment 20.

The configuring unit 230 stores in a storage device various types of configuration information received from the base station apparatus 10 or the user equipment 20 by the receiving unit 220 and reads out the configuration information from the storage device as needed. The configuring unit 230 also stores configuration information configured in advance. The contents of the configuration information are, for example, information about V2X and HARQ processing and the like.

As explained in the embodiment, the control unit 240 controls D2D communication executed with another user equipment 20. The control unit 240 executes V2X and HARQ processing. A functional unit configured to transmit signals in the control unit 240 may be included in the transmitting unit 210, and a functional unit configured to receive signals in the control unit 240 may be included in the receiving unit 220.

<Hardware Configuration>

The block diagrams (FIGS. 17 and 18) used for explaining the above embodiments illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices.

Figure 19:
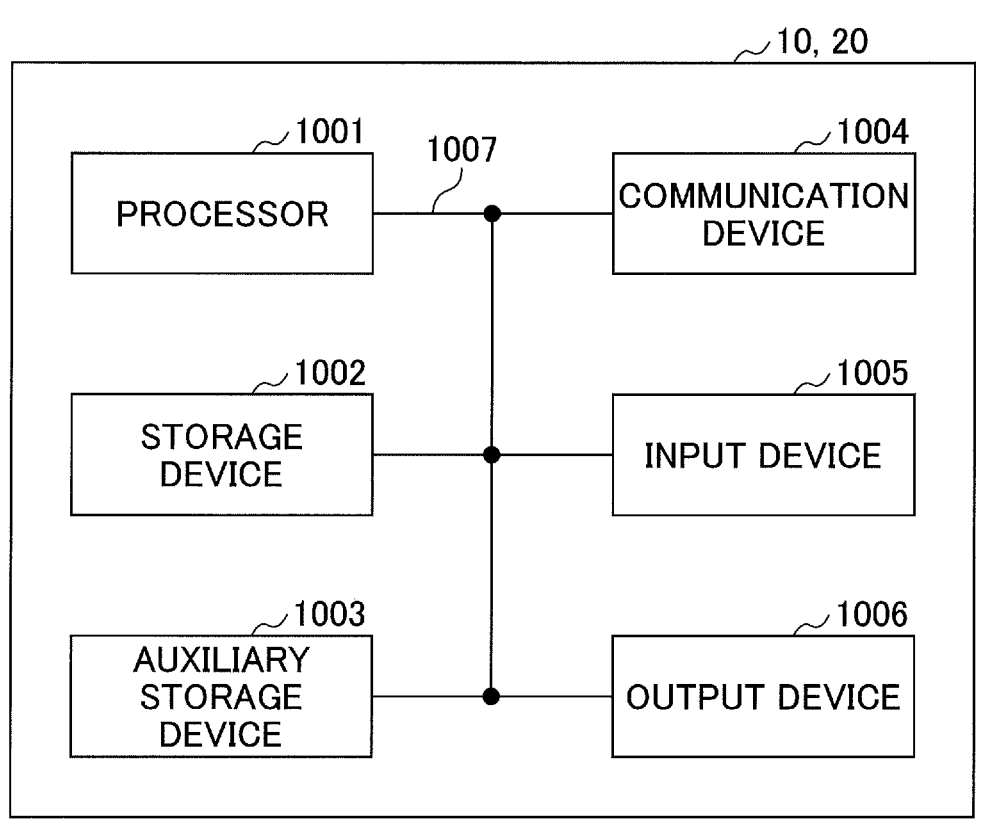
FIG. 19 is a drawing illustrating an example of a hardware configuration of a base station apparatus 10 and a communication apparatus 20 according to an embodiment.

For example, any of the base station apparatus 10, the user equipment 20, and the like according to one embodiment of the present invention may function as a computer that performs processing of a wireless communication according to the present invention. FIG. 19 is a drawing illustrating an example of a hardware configuration of a wireless communication apparatus which is the base station apparatus 10 or the user equipment 20 according to an embodiment of the present invention. Each of the base station apparatus 10 and user equipment 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station apparatus 10 and the user equipment 20 may be configured to include one or more of the devices denoted as 1001 to 1006 illustrated in drawings, or may be configured not to include some of the devices.

Each function of the base station apparatus 10 and the user equipment 20 may be implemented by reading predetermined software (program) to hardware such as the processor 1001, the storage device 1002, or the like, causing the processor 1001 to perform operations, communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like.

The processor 1001 reads a program (program code), a software module, or data from the auxiliary storage device 1003 and/or the communication device 1004 onto the storage device 1002, and performs various processes according to the program, the software module, or the data. As the program, a program that causes a computer to perform at least some of the operations described in the embodiment explained above is used. For example, the transmitting unit 110, the receiving unit 120, the configuring unit 130, and the control unit 140 of the base station apparatus 10, as illustrated in FIG. 17 may be implemented by a control program that is stored in the storage device 1002 and that is executed by the processor 1001. Also, for example, the transmitting unit 210, the receiving unit 220, the configuring unit 230, the control unit 240 of the user equipment 20, as illustrated in FIG. 18, may be implemented by a control program that is stored in the storage device 1002 and that is executed by the processor 1001. Explanation has been provided above for the case in which the above various types of processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform processing according to an embodiment of the present invention.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The auxiliary storage device 1003 may be referred to as an auxiliary storage device. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired network and a wireless network and may also be referred to as, for example, a network device, a network controller, a network card, a communication module, or the like. For example, the transmitting unit 110 and the receiving unit 120 of the base station apparatus 10 may be achieved by the communication device 1004. The transmitting unit 210 and the receiving unit 220 of the user equipment 20 may be achieved by the communication device 1004.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

Each of the base station apparatus 10 and the user equipment 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

<Summary of Embodiment>

As described above, according to an embodiment of the present invention, provided is a communication apparatus including a transmitting unit configured to transmit a Sidelink Feedback Control Information (SFCI) including a Hybrid Automatic Repeat Request (HARQ) response on a Physical Sidelink Feedback Channel (PSFCH), and a control unit configured to, in a case where the PSFCH and another inter-terminal direct communication channel overlap, perform control to transmit the SFCI by multiplexing the SFCI with the another inter-terminal direct communication channel.

According to the above configuration, in a case where a PSFCH and another inter-terminal direct communication channel overlaps, transmission of each channel can be appropriately controlled.

In a case where a PSFCH and another inter-terminal direct communication channel overlaps, control may be performed to transmit the PSFCH and the another inter-terminal direct communication channel simultaneously.

In a case where a PSFCH overlaps another inter-terminal direct communication channel, control may be performed to transmit the PSFCH and the another inter-terminal direct communication channel by time-division multiplexing the PSFCH with the another inter-terminal direct communication channel.

In a case where a PSFCH and another inter-terminal direct communication channel overlaps, control may be performed so as not to transmit any one of the PSFCH and the another inter-terminal direct communication channel.

In a case where a PSFCH and another inter-terminal direct communication channel overlaps, depending on a situation, a control may be performed to transmit the SFCI by multiplexing the SFCI with the another inter-terminal direct communication channel, a control may be performed to transmit the PSFCH and the another inter-terminal direct communication channel simultaneously, a control may be performed to transmit the PSFCH and the another inter-terminal direct communication channel by time-division multiplexing the PSFCH with the another inter-terminal direct communication channel, or a control may be performed so as not to transmit any one of the PSFCH and the another inter-terminal direct communication channel.

US 12,598,028 B2

13

<Supplements to Embodiment>

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiments, the orders of steps may be changed unless a contradiction arises. For the sake of convenience for describing the processing, the base station apparatus 10 and the user equipment 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the indication of information is not limited to the aspect or embodiment described in the present specification, but may be performed by other methods. For example, the indication of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

An aspect/embodiment described in the present specification may be applied to a system that uses LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), other appropriate systems, and/or a next generation system enhanced based thereon.

In the operation procedures, sequences, flowcharts, and the like according to each aspect and embodiment described in the present specification, the orders of steps may be changed unless a contradiction arises. For example, in the methods described in the present specification, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user equipment 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. But the another network node may be a combination of a plurality of other network nodes (for example, a MME and an S-GW).

An aspect/embodiment described in the present specification may be used independently, may be used in combination, or may be used by switching according to operations.

By the person skilled in the art, the user equipment 20 may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

There is a case in which the base station apparatus 10 may be referred to, by a person skilled in the art, as a NB (NodeB), an eNB (evolved NodeB), a gNB, a base station, or some other appropriate terms.

The terms "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination.

A term "based on" used in the present specification does not mean "based on only" unless otherwise specifically noted. In other words, a term "base on" means both "based on only" and "based on at least".

In a case where any one of "include", "including", and variations thereof is used in the present specification or claims, each of these terms is intended to be inclusive in the same way as the term "comprising". Further, the term "or" used in the present specification or claims is intended to be not exclusive-or.

Throughout the present disclosure, in a case where an article such as "a", "an", or "the" in English is added through a translation, the present disclosure may include a case where a noun following such article is of a plural form, unless otherwise clearly indicated by the context.

In the embodiments of the present invention, signals transmitted via PSFCH, PSCCH, and/or PSSCH are examples of a signal of inter-terminal direct communication.

Although the present invention has been described above, it will be understood by those skilled in the art that the present invention is not limited to the embodiment described in the present disclosure. Modifications and changes of the present invention may be possible without departing from the subject matter and the scope of the present invention defined by claims. Therefore, the descriptions of the present invention are for illustrative purposes only, and are not intended to be limiting the present invention in any way.

REFERENCE SIGNS LIST

10 base station apparatus
110 transmitting unit
120 receiving unit
130 configuring unit
140 control unit
20 user equipment
210 transmitting unit
220 receiving unit
230 configuring unit
240 control unit
1001 processor
1002 storage device
1003 auxiliary storage device
1004 communication device
1005 input device
1006 output device

The invention claimed is:

1. A communication apparatus comprising:
a transmitter that transmits an inter-terminal direct communication feedback channel including a Hybrid Automatic Repeat Request (HARQ) response;
a processor that:
in a case where a transmission occasion of the inter-terminal direct communication feedback channel overlaps a transmission occasion of another inter-terminal direct communication feedback channel, determines, based on priority assigned to each of the inter-terminal direct communication feedback channel and the another inter-terminal direct communication feedback channel, whether to transmit each of the inter-terminal direct communication feedback channel and the another inter-terminal direct communication feedback channel; and
after the determination based on the priority, further performs control whether to transmit each of the inter-terminal direct communication feedback channel and the another inter-terminal direct communication feedback channel based on transmission power based on downlink control information (DCI),
wherein the transmitter transmits, based on the control performed by the processor, the inter-terminal direct communication feedback channel;

the transmitter transmits another inter-terminal direct communication channel, the another inter-terminal direct communication channel being Physical Sidelink Shared Channel (PSSCH); and
the processor controls to transmit the inter-terminal direct communication feedback channel and the another inter-terminal direct communication feedback channel by performing time division multiplexing.

2. The communication apparatus according to claim 1, wherein
the processor controls, based on inter-terminal direct communication control information (SCI), to transmit or not to transmit each of the inter-terminal direct communication feedback channel and the another inter-terminal direct communication feedback channel.

3. A communication method of a communication apparatus, the communication method comprising:
transmitting an inter-terminal direct communication feedback channel including a Hybrid Automatic Repeat Request (HARQ) response;
in a case where a transmission occasion of an inter-terminal direct communication feedback channel overlaps a transmission occasion of another inter-terminal direct communication feedback channel, determining, based on priority assigned to each of the inter-terminal direct communication feedback channel and the another inter-terminal direct communication feedback channel, whether to transmit each of the inter-terminal direct communication feedback channel and the another inter-terminal direct communication feedback channel;
after the determination based on the priority, performing control to whether to transmit each of the inter-terminal direct communication feedback channel and the another inter-terminal direct communication feedback channel based on transmission power based on downlink control information (DCI);
transmitting the inter-terminal direct communication feedback channel based on the control;
transmitting another inter-terminal direct communication channel, the another inter-terminal direct communication channel being Physical Sidelink Shared Channel (PSSCH); and
controlling to transmit the inter-terminal direct communication feedback channel and the another inter-terminal direct communication feedback channel by performing time division multiplexing.

* * * * *